United States Patent
Lester et al.

[11] Patent Number: 6,024,131
[45] Date of Patent: Feb. 15, 2000

[54] FLEXIBLE TUBING

[75] Inventors: Michael E. Lester, Burton; Steven P. Schmitt, Huntsburg, both of Ohio

[73] Assignee: Electrolock, Inc., Chagrin Falls, Ohio

[21] Appl. No.: 09/130,733

[22] Filed: Aug. 7, 1998

[51] Int. Cl.[7] .............................. F16L 11/11; B65H 81/04
[52] U.S. Cl. ...................... 138/121; 138/129; 138/138; 138/143; 138/144; 138/154; 138/DIG. 11; 156/194
[58] Field of Search .................... 138/121, 129, 138/138, 143, 144, 154, 177, DIG. 11; 264/167; 156/183, 191, 194, 195

[56] References Cited

U.S. PATENT DOCUMENTS

| | | | |
|---|---|---|---|
| 1,670,162 | 5/1928 | Neidich | 138/177 |
| 2,663,321 | 12/1953 | Jantsch | 138/DIG. 11 |
| 2,679,887 | 6/1954 | Doyle | 156/183 |
| 2,819,488 | 1/1958 | Gimbel | 138/121 |
| 3,716,733 | 2/1973 | Keith et al. . | |
| 3,783,908 | 1/1974 | Stump et al. | 138/144 |
| 4,125,130 | 11/1978 | Yamamoto | 138/121 |
| 4,284,455 | 8/1981 | Morin | 156/195 |
| 4,294,638 | 10/1981 | Rasmussen | 264/173 |
| 4,802,511 | 2/1989 | Hensley | 138/177 |
| 5,019,012 | 5/1991 | Townsend et al. | 138/129 |
| 5,228,479 | 7/1993 | Thomas | 138/143 |

OTHER PUBLICATIONS

Clevaflex, Ltd., "Convoluted Multi–Ply Shielding", Jan. 1997, 6pgs. Sept. 1999.

*Primary Examiner*—James F. Hook
*Attorney, Agent, or Firm*—Pearne, Gordon, McCoy & Granger LLP

[57] ABSTRACT

A method of forming a flexible spiral-wound tube includes the steps of spiral wrapping at least two webs of material in an overlapping relationship about a mandrel to form a multi-ply tube and advancing the tube along the mandrel and off a reduced diameter portion of the mandrel at a forward end of the mandrel. Advancement of the tube along the mandrel includes rotating the tube as the tube longitudinally moves such that the tube advances in a spiral manner. The method further includes the step of retarding movement of the tube along the reduced diameter portion of the mandrel by providing frictional resistance between the tube and the mandrel to form folds or pleats in the tube so that the tube becomes extremely flexible. The flexible spiral-wound tube has a uniform pattern of generally diamond-shaped folds therein.

20 Claims, 3 Drawing Sheets

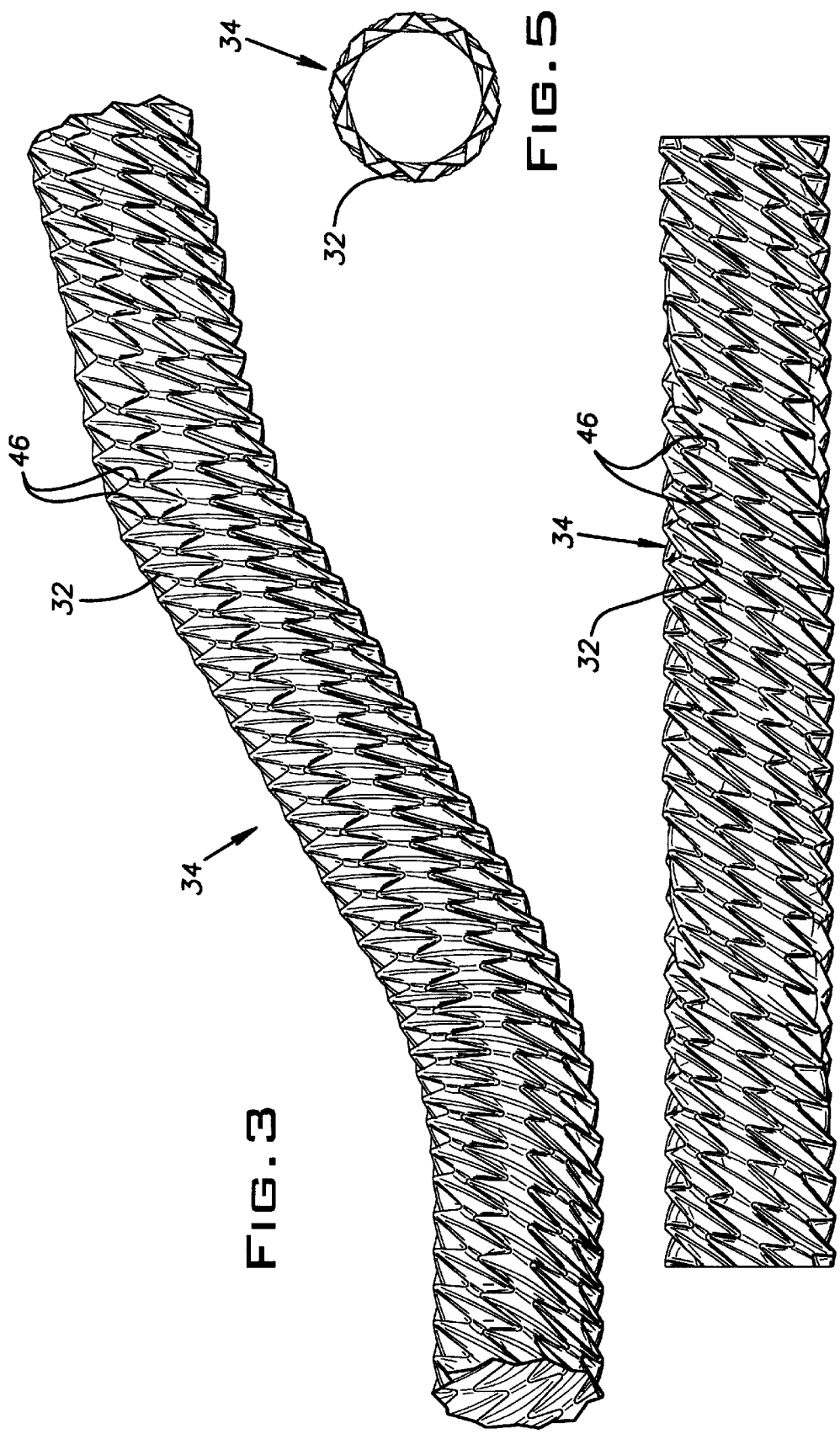

FLEXIBLE TUBING

BACKGROUND OF THE INVENTION

The present invention generally relates to flexible tubing and, more specifically, to spiral-wound tubing which is flexible.

Tubes are often used as protective coverings such as, for example, over lead wires associated with electric motors and the like. The tubes can protect against many different types of potentially harmful conditions such as preventing abrasion and wear, insulating against heat, and/or insulating against EMF interference.

Often it is desirable for the tubes to have suitable flexibility for forming compound shapes and conforming to the shape of the protected item. Many plastic corrugated tubes are known which provide flexibility. For example, see U.S. Pat. No. 3,908,704, the disclosure of which is expressly incorporated herein in its entirety. These tubes, however, can only be use in a limited number of situations because only a limited number of materials can be used. Additionally, the plastic corrugated tubes are often molded or extruded and therefore are relatively expensive to produce.

Spiral-wound tubes are used in many applications because of the wide variety of materials which can be used and the relatively low cost of production. Such spiral-wound tubes, however, are typically semi-rigid. One approach to make a length of spiral-wound tube some what flexible has been to longitudinally crush it to form numerous generally annular-shaped and nonuniform pleats or corrugations therein. The crushing process, however, adds an additional manufacturing step after the tubes are cut to length which is relatively difficult and expensive to implement. Additionally, the tubes do not provide sufficient flexibility for some applications.

Accordingly, there is a need in the art for improved flexible tubing which can be produced from a wide variety of materials, has a high degree of flexibility, and is relatively inexpensive to produce.

BRIEF SUMMARY OF THE INVENTION

The present invention provides a method and apparatus for forming a flexible tube which overcomes at least some of the above-noted problems of the related art. The method of the present invention includes the steps of spiral wrapping at least two webs of material in an overlapping relationship about a mandrel to form a multi-ply tube and advancing the tube along the mandrel and off a forward end of the mandrel. The method also includes the step of retarding movement of the tube along the mandrel to form folds therein so that the tube becomes flexible. Preferably, the step of advancing the tube along the mandrel includes rotating the tube as the tube longitudinally moves such that the tube advances in a spiral manner. Retarding such movement of the tube forms a uniform pattern of generally diamond-shaped folds in the tube.

According to another aspect of the present invention, movement of the tube is retarded by providing suitable frictional resistance between the tube and the mandrel. The frictional resistance is provided by a reduced diameter portion of the mandrel at a forward in of the mandrel. In one variation of the present invention, the tube itself maintains the frictional resistance. In another variation of the present invention, tooling engages the tube and pushes the tube against the mandrel to provide the frictional resistance.

A flexible spiral-wound tube according to the present invention has a uniform pattern of generally diamond-shaped folds or pleats. Such folds provide a high degree of flexibility. As can be appreciated by one skilled in the art, the tubes are relatively inexpensive to produce and can be produced from a wide variety of materials.

BRIEF DESCRIPTION OF THE SEVERAL VIEWS OF THE DRAWING

These and further features of the present invention will be apparent with reference to the following description and drawings, wherein:

FIG. 3 is an enlarged perspective view of a flexible spiral-wound tube formed by the apparatus and method of FIGS. 1 and 2;

FIG. 4 is a side view of the flexible tube of FIG. 3;

FIG. 5 is an end view of the flexible tube of FIGS. 3 and 4;

DETAILED DESCRIPTION OF PREFERRED EMBODIMENTS

Figure 1:
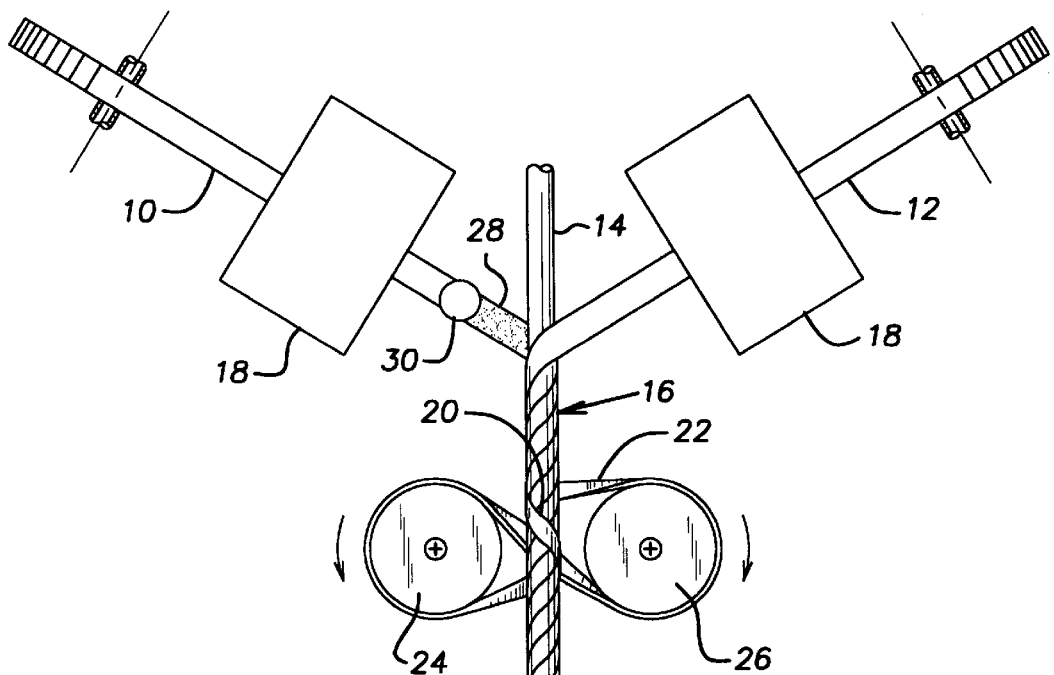
FIG. 1 is a plan view of an apparatus and method for forming a flexible spiral-wound tube according to the present invention.

FIG. 1 illustrates a method and apparatus for forming flexible spiral-wound tubing according to the present invention. Inner and outer strips of material or webs 10, 12 are fed from supply rolls to a stationary mandrel 14. The first or inner web 10 is spiral wrapped about the stationary mandrel 14 with transverse edges overlapping to form a first or inner layer. The second or outer web 12 is spiral wrapped about the stationary mandrel 14 on the top or outer surface of the first web 10 with transverse edges overlapping to form a second or outer layer.

Such an arrangement forms a spiral-wound tube 16 on the stationary mandrel 14 having two plies or layers 10, 12 of material. It should be noted, however, that additional webs of material can be fed to form a spiral-wound tube 16 having more than two layers of material. For example, a third web can be fed to form a spiral-wound tube 16 having three (inner, intermediate and outer) layers of material.

The webs 10, 12 can be of any suitable material for forming a spiral-wound tube 16. Each web 10, 12 can be the same material or can be different materials. To form a flexible tube 16 for shielding wires or cable from EMF interference, for example, the spiral-wound tube 16 can have an inner web 10 of polyester film (such as Mylar) and an outer web 12 of "dead soft" copper. To form a flexible tube for shielding wires or cable from heat, for example, the spiral-wound tube 16 can have an inner web 10 of nylon paper (such as Nomex) and an outer web 12 of aluminum or metallized polyimide.

The webs 10, 12 are preferably provided with a layer of adhesive on the side to be secured to the other web 10, 12. The adhesive, therefore, is located on the top or outer side of the first or inner web 10 and the bottom or inner side of second web 12 and any subsequent webs. The layer of adhesive can be of any suitable material for forming the spiral-wound tube 16. For example, the adhesive can be a water based polyester adhesive.

The webs 10, 12 are preferably passed through heaters 18. The heaters 18 preferably have infrared heating elements but can alternatively have other known types of heating elements. The heaters 18 also preferably have forced air to enhance water from the adhesive layers.

The two webs 10, 12 are fed between the stationary mandrel 14 and a loop 20 of a twisted continuous belt 22. The belt 22 continuously moves in a twisted configuration around a drive roller 24, a driven roller 26, and the loop 20 around the spiral-wound tube 16 and the stationary mandrel 14. Sufficient pressure is applied between the two webs 10, 12 to secure the webs 10, 12 together by action of the continuous belt 22 drawing the two webs 10, 12, from the supply rolls, under tension. The twisted continuous belt 22 typically has a width of about 1.0 to 2.0 inches and turns at a speed sufficient to produce the product as described herein. It is believed, however, that the belt 22 should be turned at a speed which is slower than prior art methods of forming spiral-wound tubes 16. Those skilled in the art can readily determine the required speed of production from the information set forth herein.

Motion is imparted to the coiled laminated webs 10, 12 by the twisted continuous belt 22 about the stationary mandrel 14 which forwardly moves the spiral-wound tube 16 along the stationary mandrel 14 and off a forward end of the stationary mandrel 14. The twisted continuous belt 22 moves the spiral-wound tube 16 in a spiral-like manner, that is, the spiral-wound tube 16 is longitudinally moving along the stationary mandrel 14 and is simultaneously rotating about a central axis of the stationary mandrel 14.

A lubricant 28 can be applied to the inner surface of the inner web 10 by an applicator 30 if lubrication is necessary between the internal circumference of the spiral-wound tube 16 and the stationary mandrel 14. The applicator 30 is typically positioned between the heater 18 and the stationary mandrel 14. The lubricant 28 can be of any suitable type which is completely inert upon formation of the spiral-wound tube 16 and/or during subsequent storage and use of the end product. Preferably, the lubricant 30 is a wax such as, for example, a self emulsifying Diethylene Glycol Disterate. Such a lubricant 30 is available from Lanza of Fairlawn, N.J. When a wax is used as the lubricant 30, the applicator 30 includes a heating element to melt the wax and the stationary mandrel 14 is preferably heated to keep the lubricant 30 melted.

The above described tube-winding device for forming the spiral-wound tube 16, can be of the type conventionally used in the cardboard tube manufacturing industry. Those skilled in the art, are commonly aware of the method of manufacturing and utilizing such a device such spiral tube winders are manufactured and sold, for example, by Rockport Machine Co. of Cleveland, Ohio, and Paco Winders Manufacturing, Inc. of Philadelphia, Pa. The primary difference between the operation of the cardboard tube winding device and the device depicted herein, is that cardboard tubes are freely moved off the stationary mandrel 14 by the twisted continuous belt 22.

Figure 2:
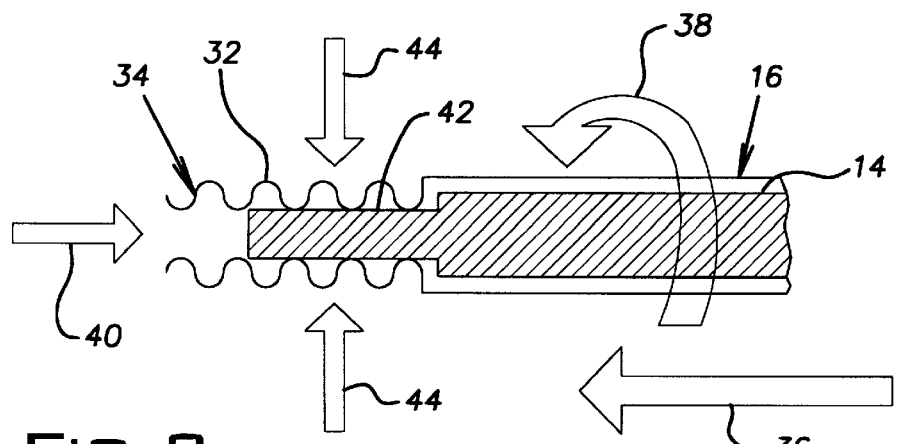
FIG. 2 is a diagrammatic view of the formation of folds in a spiral-wound tube to form the flexible tube according to the present invention.

As diagrammatically shown in FIG. 2, the spiral-wound tube 16 does not freely move off of the forward end of the stationary mandrel 14. Forward, that is downstream, of the twisted continuous belt 22 (FIG. 1), forward movement of the spiral-wound tube 16 is retarded or impeded to form bends or folds 32 therein so that the spiral-wound tube 16 becomes a flexible spiral-wound tube 34. As a result of the delay by the impedance, the spiral-wound tube 16 is longitudinally crushed in a twisting manner because the twisted continuous belt 22 (FIG. 1) continues to advance the spiral-wound tube 16 along the stationary mandrel 14. The forward movement (indicated by arrows 36, 38) is preferably retarded by frictional resistance (indicated by arrow 36) between the spiral-wound tube 16 and the stationary mandrel 14.

As best shown in FIG. 2, the stationary mandrel preferably has a reduced diameter portion 42 at a forward end thereof. Radially inward forces (indicated by arrow 44) are applied to the outer diameter of the flexible spiral-wound tube 34 to squeeze the tube 34 against the reduced portion 42 of the stationary mandrel 14 wherein frictional resistance 40 retards the forward motion 36, 38 of the spiral-wound tube 16. With some materials, the inward forces 44 need only be temporarily applied to initiate the retardation. In this case, the inward forces 44 can be provided by the operator's fingers squeezing the flexible-spiral-wound tube 34. The operator then releases the flexible spiral-wound tube 34 once the retardation has begun and the retardation continues after the operator releases the flexible spiral-wound tube 34. The flexible spiral-wound tube 34 itself maintains the retardation, that is, the tube material is stiff enough to maintain the inward forces 44. It should be apparent that the amount of frictional resistance 40 obtained is dependent of the web materials, i.e. coefficient of friction, and the size of the reduced portion 42 of the stationary mandrel 14, i.e. size of the reduced diameter relative to the main diameter and the length of the reduced portion 42. With other materials, the inward forces 44 must be applied continuously or at least intermittently to both initiate and/or maintain the retardation process as described in more detail hereinafter.

While the forward movement 36, 38 of the spiral-wound tube 16 is retarded in the above-described manner, it is not stopped. Therefore, the now flexible spiral-wound tube 34 moves off the forward end of the stationary mandrel 14. A suitable cutting mechanism (not shown) such as, for example, a rotary knife or an air-actuated guillotine cuts off the flexible spiral-wound tube 34 at desired lengths.

A product, that is a flexible spiral-wound tube 34, formed by the above-described process and device is depicted in FIGS. 3–5. The flexible spiral-wound tube 34 has a uniform pattern of generally diamond-shaped folds 34 in the tube 34 which act as corrugations. The diamond-shaped folds 34 are arranged in longitudinally extending rows wherein adjacent diamond-shaped folds overlap such that the would be pointed sides of each "diamond" are truncated sides 46. The diamond-shaped folds 32 are also angled within each row and the rows spiral about the flexible spiral-wound tube 34.

Figure 6:
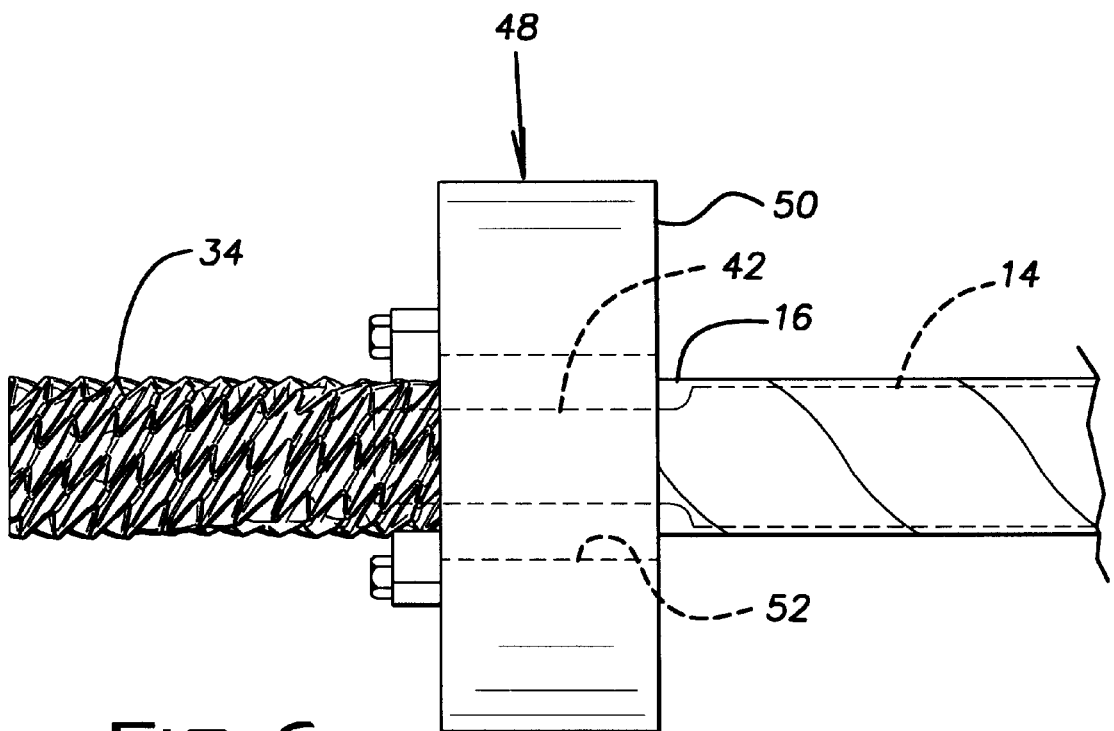
FIG. 6 is a side elevational view of tooling engaging a spiral-wound tube to form a flexible tube according to the present invention.
Figure 7:
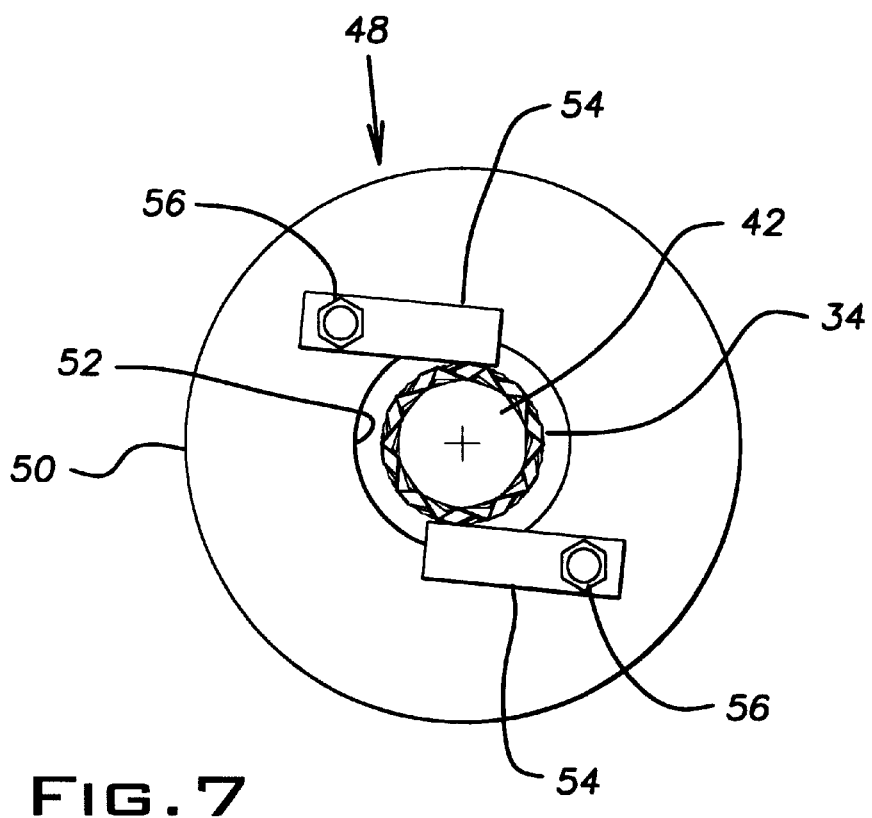
FIG. 7 is an end elevational view of the tooling and the flexible spiral-wound tube of FIG. 6.

As best shown in FIGS. 6 and 7, the forward end of the stationary mandrel 14 can be provided with retardation tooling 48, that is, a device for forcing the flexible spiral-wound tube 34 radially inwardly toward the reduced portion 42 of the stationary mandrel 14 so that a desired frictional resistance is maintained. The device 48 includes a main body 50 having a bore or passage 52 sized for passage of the reduced portion 42 of the stationary mandrel 14 and the tube 16, 34 therethrough. The main body 50 is supported in a fixed position with the stationary mandrel 14 generally coaxial with the passage 52 and extending therethrough.

The device 48 also includes a pair of arms 54 secured to the front surface of the main body 50. Each arm 54 is secured to the main body 50 at one end by a suitable fastener 56 such as, for example, the illustrated machine screw. Each arm 54 is positioned so that the other end, that is the free end, can engage the outer diameter of the flexible spiral-wound tube 34 and provide radially inward forces thereto toward the reduced portion 42 of the stationary mandrel 14. The arms 54 are preferably positioned on opposite sides of the flexible spiral-wound tube 34. The arms 54, therefore, can be selectively pivoted about the fasteners 56 to adjust the position of the arms 54, and therefore the amount of inward force applied to the flexible spiral-wound tube 34, until the desired amount of frictional resistance is obtained.

To adjust the frictional resistance, the fasteners 56 are loosened and the arms 54 are pivoted about the fasteners 56 toward or away from the flexible spiral-wound tube 34 as the winding device is operating. When the desired frictional resistance is obtained, the fasteners 54 are tightened so that the position of the arms 54 is fixed. The flexible spiral-wound tube 34 is then formed as described herein above.

In a preferred embodiment of the present invention forming a cable shield, each web 10, 12 is about 1.0 inch wide and the stationary mandrel 14 has a main diameter of about 0.437 inches and a reduced portion diameter of about 0.313 inches. The reduced portion 42 of the stationary mandrel 14 preferably has a length in the range of about 2.0 inches to about 8.0 inches, and more preferably a length of about 4.0 inches. The first web or layer 10 is a polyester film such as Mylar and is about 0.001 inches thick. A polyester adhesive having a thickness of about 0.0003 inches is located on the top or outer side of the first layer 10. An intermediate web or layer 12 is "dead soft" copper, that is non work-hardened copper, and is about 0.0015 inches thick. A polyester adhesive having a thickness of about 0.0003 inches is located on the bottom or inner side of the second layer 12. A third web or layer is a polyester film such as Mylar and is about 0.001 inches thick. A polyester adhesive having a thickness of about 0.0003 inches is located on the bottom or inner side of the third layer.

In a preferred embodiment of the present invention forming a heat shield, each web 10, 12 is about 1.0 inch wide and the stationary mandrel 14 has a main diameter of about 0.437 inches and a reduced portion diameter of about 0.313 inches. The reduced portion 42 of the stationary mandrel 14 preferably has a length in the range of about 2.0 inches to about 8.0 inches, and more preferably a length of about 4.0 inches. The inner web or layer 10 is a nylon paper such as Nomex and is about 0.002 inches thick. A polyester adhesive having a thickness of about 0.0003 inches is located on the top or outer side of the inner layer 10. The outer web or layer 12 is an aluminum alloy and is about 0.0015 inches thick. A polyester adhesive having a thickness of about 0.0003 inches is located on the bottom or inner side of the outer layer 12.

In another preferred embodiment of the present invention forming a heat shield, each web 10, 12 is about 1.0 inch wide and the stationary mandrel 14 has a main diameter of about 0.437 inches and a reduced portion diameter of about 0.313 inches. The reduced portion 42 of the stationary mandrel 14 preferably has a length in the range of about 2.0 inches to about 8.0 inches, and more preferably a length of about 4.0 inches. The inner web or layer 10 is a nylon paper such as Nomex and is about 0.002 inches thick. A polyester adhesive having a thickness of about 0.0003 inches is located on the top or outer side of the inner layer 10. The outer web or layer 12 is metallized polyimide and is about 0.0015 inches thick. A polyester adhesive having a thickness of about 0.0003 inches is located on the bottom or inner side of the outer layer 12.

The dimensions of the webs 10, 12 and the stationary mandrel 14 can vary, in accordance with practice. The dimensions shown are merely exemplary and result in an extremely efficient operation.

When other web materials are utilized in forming the flexible spiral-wound tube 34, suitable web dimensions, mandrel dimensions, production rates, and/or retardation tooling should be used. Those skilled in the art can readily determine the values from the information set forth herein.

After the flexible spiral-wound tube 34 is formed on the stationary mandrel 14, crushed in a twisted fashion, and cut into the desired lengths, the ultimate user can take the tube 34 and flex it into compound shapes. Therefor, the tubes 34 can be positioned over a variety of cables or wires and the like which are required to be snaked into a variety of shapes to conform to the specific environment.

It can be seen from the above description that the present invention provides a flexible spiral-wound tube 34, and method for producing such, which has increased flexibility and is easily and inexpensively produced compared to prior art flexible tubes.

Although particular embodiments of the invention have been described in detail, it will be understood that the invention is not limited correspondingly in scope, but includes all changes and modifications coming within the spirit and terms of the claims appended hereto.

What is claimed is:

1. A method of forming a flexible tube comprising the steps of:

spiral wrapping at least two webs of material in an overlapping relationship about a mandrel to form a multi-ply tube;

advancing the tube along the mandrel and off a forward end of the mandrel; and retarding movement of the tube along the mandrel to form folds therein so that the tube becomes flexible.

2. The method according to claim 1, wherein said step of advancing the tube along the mandrel includes advancing the tube along a reduced diameter portion of the mandrel.

3. The method according to claim 2, wherein said step of advancing the tube along the reduced diameter portion of the mandrel occurs at the forward end of the mandrel.

4. The method according to claim 1, wherein said step of retarding movement occurs along a reduced diameter portion of the mandrel.

5. The method according to claim 1, wherein said step of retarding movement occurs near the forward end of the mandrel.

6. The method according to claim 1, wherein said step of retarding movement includes providing frictional resistance between the tube and the mandrel.

7. The method according to claim 6, wherein providing frictional resistance includes pushing the tube against the mandrel.

8. The method according to claim 7, wherein said step of pushing the tube against the mandrel continues once sufficient frictional resistance is provided.

9. The method according to claim 7, wherein said step of pushing the tube against the mandrel includes engaging the tube with tooling.

10. The method according to claim 7, wherein said step of pushing the tube against the mandrel is temporary and stops once sufficient frictional resistance is provided.

11. The method according to claim 10, wherein said step of pushing the tube against the mandrel includes an operator's fingers squeezing the tube.

12. The method according to claim 1, wherein said step of advancing the tube along the mandrel includes rotating the tube as the tube longitudinally moves such that the tube advances in a spiral manner.

13. The method according to claim 1, wherein said step of retarding movement of the tube includes forming a uniform pattern of generally diamond-shaped folds in the tube.

14. A method of forming a flexible spiral-wound tube comprising the steps of:
   spiral wrapping at least two webs of material in an overlapping relationship about a mandrel to form a multi-ply tube;
   advancing the tube along the mandrel and off a reduced diameter portion of the mandrel at a forward end of the mandrel, wherein advancing the tube along the mandrel includes rotating the tube as the tube longitudinally moves such that the tube advances in a spiral manner; and
   retarding movement of the tube along the reduced diameter portion of the mandrel by providing frictional resistance between the tube and the mandrel to form a pattern of generally diamond-shaped folds in the tube so that the tube becomes flexible.

15. The method according to claim 14, wherein said step of providing frictional resistance includes pushing the tube against the mandrel by engaging the tube with tooling.

16. A flexible tube formed by a method comprising the steps of:
   spiral wrapping at least two webs of material in an overlapping relationship about a mandrel to form a multi-ply tube;
   advancing the tube along the mandrel and off a forward end of the mandrel; and
   retarding movement of the tube along the mandrel to form folds therein so that the tube becomes flexible.

17. The flexible tube according to claim 16, wherein said step of retarding movement of the tube along the mandrel includes forming a uniform pattern of generally diamond-shaped folds in the tube.

18. The flexible tube according to claim 16, wherein said step of spiral wrapping at least two webs of material includes spiral wrapping a web of polyester film and a web of copper.

19. The flexible tube according to claim 16, wherein said step of spiral wrapping at least two webs of material includes spiral wrapping a web of nylon paper and a web of aluminum.

20. The flexible tube according to claim 16, wherein said step of spiral wrapping at least two webs of material includes spiral wrapping a web of nylon paper and a web of metallized polyimide.

* * * * *